United States Patent
Ogasawara

(10) Patent No.: US 11,196,975 B2
(45) Date of Patent: Dec. 7, 2021

(54) IMAGE GENERATING DEVICE, IMAGE DISPLAY SYSTEM, AND IMAGE GENERATING METHOD

(71) Applicant: SONY INTERACTIVE ENTERTAINMENT INC., Tokyo (JP)

(72) Inventor: Hidehiko Ogasawara, Tokyo (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 0 days.

(21) Appl. No.: 16/607,873

(22) PCT Filed: May 18, 2017

(86) PCT No.: PCT/JP2017/018738
§ 371 (c)(1),
(2) Date: Oct. 24, 2019

(87) PCT Pub. No.: WO2018/211673
PCT Pub. Date: Nov. 22, 2018

(65) Prior Publication Data
US 2020/0120322 A1 Apr. 16, 2020

(51) Int. Cl.
*H04N 13/00* (2018.01)
*H04N 13/122* (2018.01)
(Continued)

(52) U.S. Cl.
CPC ......... *H04N 13/122* (2018.05); *H04N 13/139* (2018.05); *H04N 13/167* (2018.05); *H04N 13/344* (2018.05); *H04N 13/383* (2018.05)

(58) Field of Classification Search
CPC .. H04N 13/167; H04N 13/122; H04N 13/139; H04N 13/383; H04N 13/344; G09G 5/36; G09G 5/00
See application file for complete search history.

(56) References Cited

U.S. PATENT DOCUMENTS

| | | | |
|---|---|---|---|
| 2010/0103077 A1* | 4/2010 | Sugiyama | G02B 27/0172 345/8 |
| 2011/0280316 A1* | 11/2011 | Chen | H04N 13/161 375/240.25 |

(Continued)

FOREIGN PATENT DOCUMENTS

| | | |
|---|---|---|
| JP | 2012-226665 A | 11/2012 |
| JP | 2014-027351 A | 2/2014 |

(Continued)

OTHER PUBLICATIONS

Notice of Reasons for Refusal (Patents Application 2019-518708) drafted Apr. 21, 2020, from Japanese Patent Application No. 2019-518708, 3 sheets.

(Continued)

*Primary Examiner* — Zhihan Zhou
(74) *Attorney, Agent, or Firm* — Katten Muchin Rosenman LLP

(57) ABSTRACT

During a period when a user's dominant eye is the right eye, an image generating device (200) generates an image for the right eye (272) at a standard resolution and generates a display image for the left eye (270) at a lower resolution. During a period when the dominant eye is the left eye, the image generating device (200) generates an image for the left eye (278) at the standard resolution and generates a display image for the right eye (280) at a lower resolution. In a head mounted display (100), the images with the lower resolution are enlarged into display images (274) and (276), and the image for the left eye and the image for the right eye are displayed.

11 Claims, 11 Drawing Sheets

(51) Int. Cl.
*H04N 13/167* (2018.01)
*H04N 13/383* (2018.01)
*H04N 13/344* (2018.01)
*H04N 13/139* (2018.01)

(56) References Cited

U.S. PATENT DOCUMENTS

| | | | |
|---|---|---|---|
| 2012/0269405 A1* | 10/2012 | Kaneda | G06K 9/00604 382/118 |
| 2014/0355693 A1* | 12/2014 | Chen | H04N 13/161 375/240.26 |
| 2017/0050542 A1* | 2/2017 | Shigeta | G02B 27/0149 |
| 2017/0160550 A1* | 6/2017 | Kobayashi | G02B 27/017 |
| 2018/0096461 A1* | 4/2018 | Okayama | G06T 5/001 |

FOREIGN PATENT DOCUMENTS

| | | | |
|---|---|---|---|
| JP | 2014-532356 A | 12/2014 | |
| JP | 2016-165105 A | 9/2016 | |
| JP | 2016-197830 A | 11/2016 | |
| WO | 2009066465 A1 | 5/2009 | |
| WO | 2013/049179 A1 | 4/2013 | |
| WO | 2015162781 A1 | 10/2015 | |
| WO | 2016/157677 A1 | 10/2016 | |

OTHER PUBLICATIONS

International Search Report and Written Opinion dated Aug. 15, 2017, from International Application No. PCT/JP2017/018738, 11 sheets.

Muzdalo, "The Importance of Measuring Dynamic Visual Acuity," Coll. Antropl. 37 (2013) Suppl. 1, p. 275-285.

Joseph S. Lappin, et al. "Spatial and temporal limits of motion perception across variations in speed, eccentricity, and low vision," Journal of Vision, 2009, 9(1), 30, p. 1-14.

International Preliminary Report on Patentability dated Nov. 28, 2019, from International Application No. PCT/JP2017/018738, 16 sheets.

Notice of Reason(s) for Refusal dated Oct. 20, 2020, from Japanese Application No. 2019-518708, 3 sheets.

* cited by examiner

IMAGE GENERATING DEVICE, IMAGE DISPLAY SYSTEM, AND IMAGE GENERATING METHOD

TECHNICAL FIELD

The present invention relates to an image display technology using a head mounted display.

BACKGROUND ART

An image display system is prevalent that allows an object space to be viewed from free viewpoints. For example, a system has been developed that displays panoramic images on a head mounted display such that, when a user wearing the head mounted display rotates the user's head, panoramic images corresponding to directions of line of sights are displayed. Utilization of the head mounted display allows enhancement of a sense of immersion in videos and improvement of operability of applications such as games. A walk-through system has also been developed that allows a user wearing a head mounted display to virtually walk around in a space displayed as a video by physically moving around.

SUMMARY

Technical Problems

To improve realistic sensation using the technology as described above, high-resolution images need to be displayed at a high frame rate. As a result, there is a tendency of an increase in the amount of data transmitted between a device transmitting display images and the head mounted display. On the other hand, to allow the user wearing the head mounted display to move around freely, communication between the device transmitting display images and the head mounted display is desired to be wireless.

However, with the wireless communication, an increased amount of data transmitted increases power consumption, leading to a need for a measure such as an increase in the capacity of batteries of the head mounted display. As a result, it is expected that the weight of the head mounted display is increased or heat is generated, impairing usability of the head mounted display. Furthermore, an increased data size increases the possibility that display is delayed or transmission fails due to availability of transmission bands, the state of communication, or the like.

In view of these problems, an object of the present invention is to provide a technology capable of achieving high-quality image expression and improved usability of the head mounted display in a comparable manner.

Solution to Problems

An aspect of the present invention relates to an image generating device. The image generating device generates a pair of images to be respectively displayed for a left eye and a right eye. The image generating device includes a parameter control unit setting a predetermined parameter related to image data in at least a partial area of one image of the pair of images to make the predetermined parameter for the one image different from the predetermined parameter for an other image of the pair of images, an image generating unit generating the pair of images in accordance with the setting, and an output unit outputting data of the pair of images to a display device.

Another aspect of the present invention relates to an image display system. The image display system includes a head mounted display and an image generating device generating a pair of images to be respectively displayed for a left eye and a right eye in the head mounted display. The image generating device includes a resolution control unit setting a lower resolution for at least a partial area of one image of the pair of images than for an other image of the pair of images, an image generating unit generating a pair of images at a resolution complying with the setting, and an output unit outputting data of the pair of images to the head mounted display. The head mounted display includes an image forming unit causing the data of the image with the lower resolution output by the image generating device to be enlarged for display.

Another aspect of the present invention relates to an image generating method. The image generating method is executed by an image generating device generating a pair of images to be respectively displayed for a left eye and a right eye, and includes the steps of setting a predetermined parameter related to image data in at least a partial area of one image of the pair of images to make the predetermined parameter for the one image different from the predetermined parameter for an other image of the pair of images, generating the pair of images in accordance with the setting, and outputting data of the pair of images to a display device.

Note that effective aspects of the present invention also include optional combinations of the above-described components and representations of the present invention converted into a device, a system, a computer program, a recording medium in which the computer program is recorded, and the like.

Advantageous Effect of Invention

According to the present invention, the head mounted display can be comfortably used to achieve high-quality image expressions.

DESCRIPTION OF EMBODIMENTS

Embodiment 1

Figure 1:
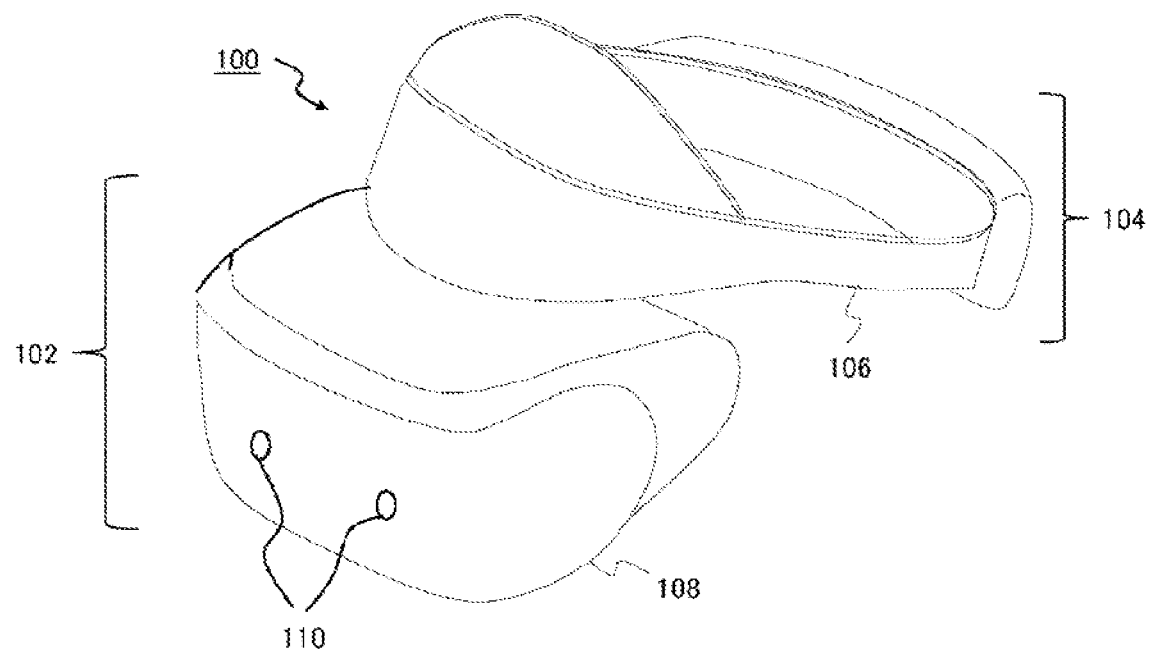
FIG. 1 is a diagram illustrating an example of appearance of a head mounted display in Embodiment 1.

FIG. 1 illustrates an example of appearance of a head mounted display of the present embodiment. In this example, a head mounted display 100 is constituted of an output mechanism unit 102 and a mounting mechanism unit 104. The mounting mechanism unit 104 includes a mounting band 106 that extends all around the head of a user to achieve fixation of the device when the user wears the head mounted display 100.

The output mechanism unit 102 includes a housing 108 shaped to cover the left and right eyes while the user wears the head mounted display 100, and internally includes a display panel such that the display panel lies opposite the eyes while the user wears the head mounted display 100. The housing 108 further internally includes lenses located between the display panel and the user's eyes while the user wears the head mounted display 100, the lenses for increasing a viewing angle of the user. Stereoscopic vision may be realized by displaying a stereo image corresponding to parallax between the two eyes, in areas into which the display panel is laterally divided.

The head mounted display 100 may further include speakers and earphones at positions corresponding to the user's ears while the user wears the head mounted display 100. In this example, the head mounted display 100 includes a stereo camera 110 in front of the housing 108 to capture moving images of a surrounding real space in a visual field corresponding to the user's line of sight. The head mounted display 100 may include, inside or outside the housing 108, any of various sensors such as an acceleration sensor, a gyro sensor, a geomagnetic sensor, and a graphics processing unit (GPU) used to derive motion, orientation, position, or the like of the head mounted display 100.

Figure 2:
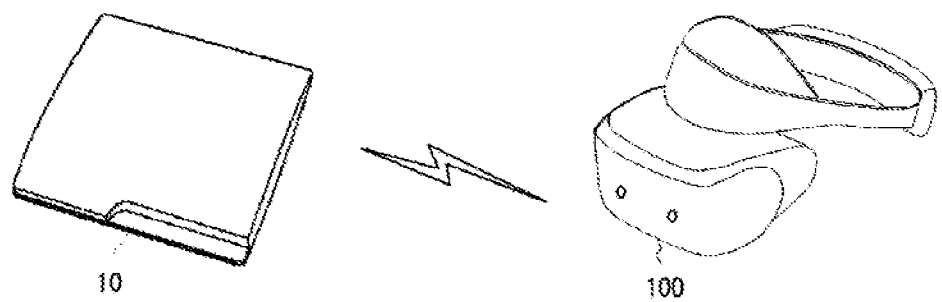
FIG. 2 is a diagram illustrating an example of a configuration of an image display system in Embodiment 1.

FIG. 2 illustrates an example of a configuration of an image display system of the present embodiment. The head mounted display 100 is connected to an image generating device 10 by wireless communication. However, the head mounted display 100 may be connected to the image generating device 10 by wire using a universal serial bus (USB) or the like. The image generating device 10 may further be connected to a server via a network. In that case, the server may provide online applications, such as games in which a plurality of users can participate via the network, to the image generating device 10.

The image generating device 10 determines the position of a viewpoint or the direction of the line of sight on the basis of the position or orientation of the head of the user wearing the head mounted display 100. The image generating device 10 generates a display image in the visual field corresponding to the position of the viewpoint or the direction of the line of sight and outputs the display image to the head mounted display 100. Here, the content of output data is not particularly limited, and may vary according to a function that the user requires the system to provide or the content of an application activated by the user.

For example, the image generating device 10 may apply certain processing to an image captured by the stereo camera 110 of the head mounted display 100 or progress an electronic game to generate a game screen. Typical such aspects include virtual reality (VR) and augmented reality (AR). Alternatively, a virtual world in which everything is constituted of a virtual object may be constructed and drawn in a visual field based on the position of the viewpoint or the direction of the line of sight of the user.

To determine the position and orientation of the head used to generate a display image, the image generating device 10 uses an existing technology such as simultaneous localization and mapping (SLAM) to analyze an image captured by the head mounted display 100. Alternatively, the image generating device 10 acquires the orientation, motion, and position of the head from measured values from sensors provided in the head mounted display 100. These Processing results may be merged to produce more precise results.

In such an image display system, the image generating device 10 reduces the resolution of at least a part of a display image while the user's head is moving, thus reducing the amount of data transmitted and preventing an increase in power consumption. In a case where a human being moves the head, surrounding objects relatively move, leading to a situation similar to a situation in which the human being is watching moving bodies. Here, human dynamic vision is known to be a fraction of static vision in a case where the human being looks at a stationary object (see, for example, Muzdalo, "The Importance of Measuring Dynamic Visual Acuity," Coll. Antropl. 37 (2013) Suppl. 1, p. 275-285). That is, in the real world, during a period when the human being is moving the head, the human being has limited vision.

On the other hand, in a case of the head mounted display, the display panel moves with the head, and thus, even for an object expressed as being located at a far distance appears, the manner in which the object appears remains unchanged, and detailed information constantly arrives at the eyeballs. Thus, general display processing may lead to deviation from the manner in which objects appear in the real world. By reducing the resolution during the period when the head is moving as described above, image expression more like a situation in which the human being is looking at the real world can be realized. As a result, the effect of reducing the amount of data transmitted and power consumption can be achieved, and image expression closer to reality can also be accomplished.

Figure 3:
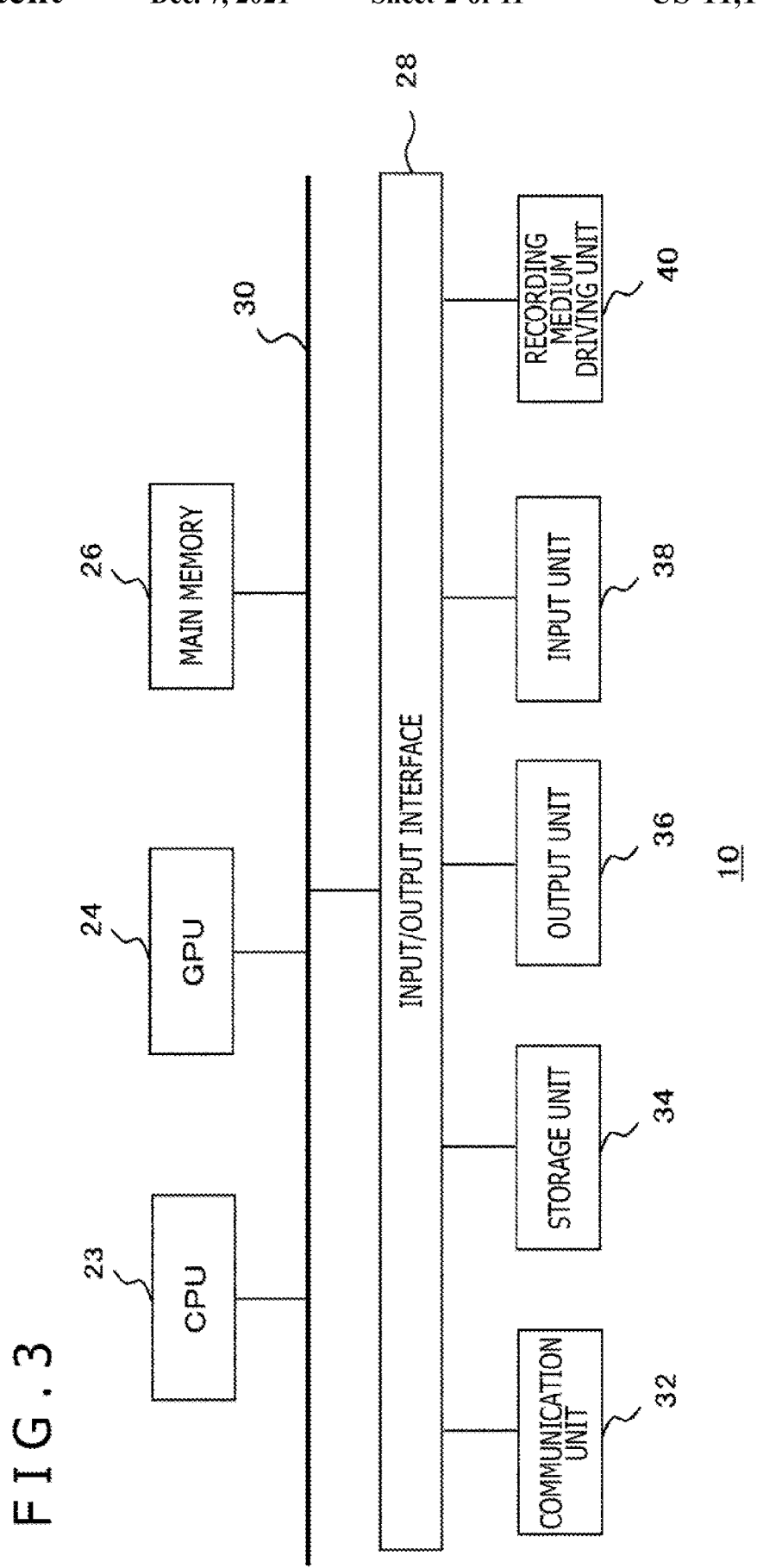
FIG. 3 is a diagram illustrating an internal circuit configuration of an image generating device in Embodiment 1.

FIG. 3 illustrates a configuration of an internal circuit of the image generating device 10. The image generating device 10 includes a central processing unit (CPU) 23, a GPU 24, and a main memory 26. These units are connected to one another via a bus 30. An input/output interface 28 is further connected to the bus 30. The input/output interface 28 connects to peripheral equipment interfaces such as a USB and an Institute of Electrical and Electronics Engineers (IEEE) 1394, a communication unit 32 consisting of a wired or wireless local area network (LAN) network interface to establish communication with the head mounted display 100, a storage unit 34 such as a hard disk drive or a nonvolatile memory, an output unit 36 outputting data to the head mounted display 100, an input unit 38 receiving data from the head mounted display 100 and an input device not illustrated, and a recording medium driving unit 40 for driving a removable recording medium such as a magnetic disc, an optical disc, or a semiconductor memory.

The CPU 23 executes an operating system stored in the storage unit 34 to control the image generating device 10 as a whole. The CPU 23 also executes various programs read from the removable recording medium and loaded into the main memory 26 or downloaded via the communication unit 32. The GPU 24 has a function for a geometry engine and a function for a rendering processor to execute drawing processing in accordance with a drawing command from the CPU 23 and provide outputs to the output unit 36. The main memory 26 is constituted of a random access memory (RAM) to store programs and data needed for processing.

Figure 4:
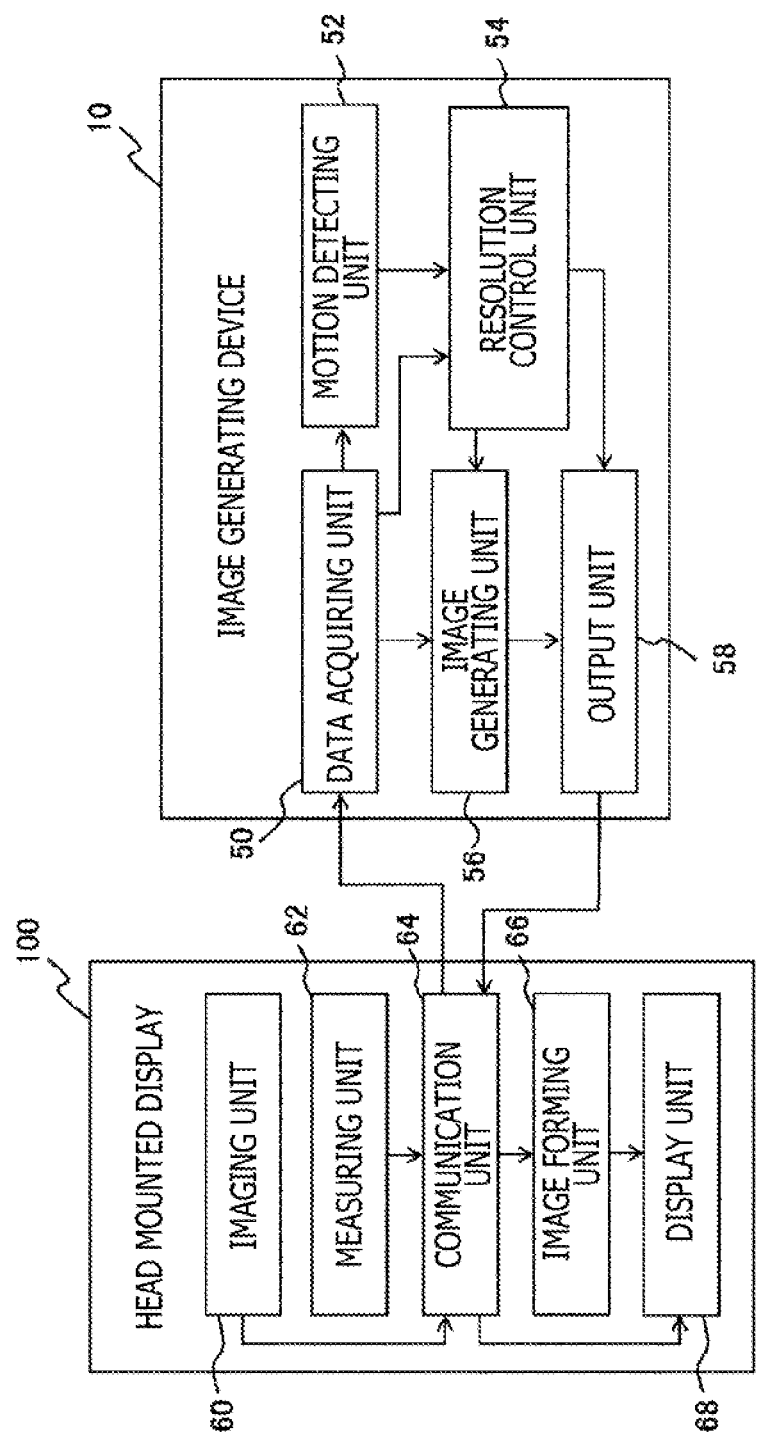
FIG. 4 is a diagram illustrating an example of a configuration of functional blocks of the image generating device and the head mounted display in Embodiment 1.

FIG. 4 illustrates a configuration of functional blocks of the image generating device 10 and the head mounted display 100. The functional blocks illustrated in FIG. 4 and FIG. 9 described below can be implemented, in terms of hardware, by the various circuits illustrated in FIG. 3, the stereo camera 110 illustrated in FIG. 1, various sensors not illustrated, the display panel, the microprocessor, the memory, and the like. In terms of software, the functional blocks are implemented by programs, loaded from the respective storage media to the respective memories, accomplishing an image analysis function, an information processing function, an image drawing function, a data input/output function, and a communication function. Accordingly, as understood by those in the art, the functional blocks can be implemented in various forms by only hardware, only software, or a combination of hardware and software. The functional blocks are not limited to any of the forms.

The image generating device 10 includes a data acquiring unit 50 for acquiring data needed for processing from the head mounted display 100, a motion detecting unit 52 for determining whether or not the user's head has moved, a resolution control unit 54 for setting the resolution of a display image depending on whether or not the head has moved, an image generating unit 56 for generating the display image at the determined resolution, and an output unit 58 for appropriately formatting the data of the display image and outputting the resultant data to the head mounted display 100.

The data acquiring unit 50 acquires, at a predetermined rate, at least either captured images from the head mounted display 100 and measured values from the sensor. Various types of data are expected to be acquired according to the contents of display images, information related to the user's viewpoint, and the type of data used to determine the motion of the head. For example, in an aspect where captured images are processed to generate display images and where the motion of the head is acquired only by image analysis, the data of the captured images may exclusively be acquired.

In an aspect where display images are entirely generated by drawing virtual objects and where the user's viewpoint and the motion of the head are determined from sensor measured values, the sensor measured values may exclusively be acquired. Needless to say, the data of both captured images and sensor measured values may be acquired. Then, the captured images may be used as display images, and information related to the viewpoint and the motion of the head may be acquired from the captured images and measured values from the motion sensor.

The motion detecting unit 52 uses at least either the captured images or the measured values from the motion sensor to determine whether or not the head has moved. For example, a rotation angle and a translational moving amount of the head are determined at a predetermined rate. When one of the values is larger than or equal to a threshold, the head is determined to be moving. When the values are smaller than the threshold, the head is determined to be stopped.

The resolution control unit 54 sets a lower resolution for at least a part of the display image during a period when the head is determined to be moving. In the simplest case, the entire image is set to have a lower resolution than in a case where the head is not moving. As described above, the dynamic vision of human beings is known to be a fraction of the static vision. For example, in a case where the dynamic vision is assumed to be two-thirds of the static vision, then in terms of pixels in a display image, 100 pixel rows are viewed at a resolution of approximately 67 rows.

Accordingly, even in a case where the resolution is reduced to two-thirds in both the vertical and horizontal directions, such a change is unlikely to be perceived. The lower resolution reduces the amount of data in the image to half or less compared to the amount of data in the original image, enabling a significant reduction in power consumption. However, a resolution reduction rate is not intended to be limited to this but an appropriate value is predetermined in view of usable transmission bands, permissible power consumption, and the like. Only one resolution reduction rate may be used or the resolution may be varied in stages according to the speed range, for example, the reduction rate is kept low when the head is moving slowly, and is increased when the head is moving fast.

Furthermore, the resolution control unit 54 may divide the display image into areas and set different resolutions for the respective areas. The resolution may be set higher, for example, for an image of an object being gazed by the user or an area within a predetermined range from a gaze point than for the other areas. In this case, a general gaze point detector is provided in the head mounted display 100, and information related to position coordinates of the gaze points of the left and right eyes with respect to the display panel is transmitted at a predetermined rate. The data acquiring unit 50 of the image generating device 10 acquires and sequentially supplies the information to the resolution control unit 54.

The area within the certain range from the gaze point is generally referred to as an "effective visual field." The effective visual field is known to be viewed with a higher vision than a "peripheral visual field." In spite of motion of the head, in a case where the viewpoint is fixed at a certain object, the motion of the object relative to the pupil is small, enabling viewing with a vision similar to a vision used for the effective visual field while the head is not moving. Accordingly, by maintaining a certain resolution for an area within a predetermined range including the gaze point, a decrease in resolution is more difficult to perceive. In a case where the captured images are analyzed by SLAM, a relationship between a real object and the direction of the line of sight is determined as three-dimensional information. Thus, on the basis of the results of the analysis, the point being gazed may be determined, and the resolution may be reduced for the other areas in the image plane.

Even in the aspect in which the image is divided into the areas and where the resolution is adjusted for the areas, the resolution for each area may be varied according to the range of a relative speed. For example, for the area including the gaze point, the resolution may be set on the basis of a relative speed between the gaze point and the object being gazed. For the other areas, the resolution may be set on the basis of the speed of the head. Furthermore, a boundary between the areas may be varied according to the speed of the head. That is, when the speed is low, the resolution is maintained for an area within a relatively wide range from the gaze point. As the speed increases, such an area is narrowed and the area with a low resolution is widened.

In this manner, according to the speed, the boundary and the resolution for each area may be varied. Note that the number of the areas between which resolution is varied is not limited to two but that the resolution may be varied among three or more areas. For example, the areas may be centered at the gaze point and concentric circles with different radii may be set as boundaries between the areas. The resolution control unit 54 executes a process of setting the resolution at a predetermined rate according to the motion of the user's head and supplies results of the process to the image generating unit 56.

The image generating unit 56 generates display images at a resolution set by the resolution control unit 54 and at a display frame rate. The images generated have various contents as described above, and certain processing may be applied to the captured images or a virtual world may be drawn so as to correspond to the user's visual field. The information related to the user's viewpoint and line of sight, needed to generate display images, may be based on measured values from the sensor acquired from the data acquiring unit 50 by the image generating unit 56, or may be determined by image analysis based on the SLAM.

In a case where the resolution control unit 54 executes the image analysis based on the SLAM to set the resolution, results of the image analysis can be shared. Note that, to vary the contents of the processing or the virtual world, the image generating unit 56 may simultaneously progress information processing for an electronic game or the like. In this case, general information processing may be executed on the basis of the motion of an object in the captured images or a user operation on an input device not illustrated.

In a case where the input device is separately introduced, the data acquiring unit 50 acquires the contents of the user operation from the input device and supplies the contents to the image generating unit 56. In some cases, the image generating unit 56 may use captured images as display images without any change. In any case, the image generating unit 56 sets, in accordance with the setting made by the resolution control unit 54, at least a partial area of the display image to have a lower resolution during a period when the user's head is moving than during a period when the user's head is not moving.

As a method for reducing the resolution, an existing technology such as Bilinear interpolation can be used. The output unit 58 appropriately formats the generated image data and sequentially transmits the data to the head mounted display 100. For example, to realize stereoscopic vision, stereo images for the left and right viewpoints generated by the image generating unit 56 are arranged in the lateral direction as final display data.

In a case where the head mounted display 100 is formed such that a display screen is viewed via a lens, the image at each viewpoint may be corrected with distortion caused by the lens taken into account, so as to make the image appear properly in this state. Note that, in a case where the data of display images is compression-coded for transmission, the output unit 58 may execute, during a compressing process, a process of reducing the resolution as described above. For example, in an aspect where the data is divided according to frequency bands of the images for transmission, high frequency components are expected to be excluded from a transmission target in accordance with the setting of the resolution made by the resolution control unit 54.

Furthermore, the output unit adds information related to the resolution of the image as transmission data to allow the head mounted display 100 to generate a display image with a size corresponding to the resolution of the display panel. For example, in a case where the resolution of the entire image is uniformly reduced, the value of the resolution is transmitted in association with each frame of the display image. In a case where the resolution is varied with the area, data is transmitted in which the area and the resolution are associated with each other.

The head mounted display 100 includes an imaging unit 60 for capturing moving images of the real space, a measuring unit 62 for measuring the orientation, motion, position, and the like of the head mounted display, a communication unit 64 for establishing communication with the image generating device 10, an image forming unit 66 for forming, into a final display form, the data of display images transmitted from the image generating device 10, and a display unit 68 displaying the images.

The imaging unit 60 is implemented by a general imaging device configuration such as the stereo camera 110 in FIG. 1 or a monocular camera, and captures images of the real space in front of the user at a predetermined frame rate. The measuring unit 62 is constituted of at least any of sensors such as an acceleration sensor, a gyro sensor, a geomagnetic sensor, a global positioning system (GPS), and the like to sequentially measure the acceleration or angular acceleration of the head mounted display 100 and thus of the head of the user wearing the head mounted display 100. The sensors may be combined into an inertia measuring device to allow angle, speed, and position to be derived.

Note that, depending on the data needed by the image generating device 10 as described above, only one of the imaging unit 60 and the measuring unit 62 needs to function in some cases. Moreover, a gaze point detector may be introduced into the measuring unit 62 to derive the position coordinates of the gaze points in the display panel. The communication unit 64 sequentially transmits, to the image generating device 10, at least either the captured images from the imaging unit 60 or the measured values from the measuring unit 62. The communication unit 64 further receives the data of the display images transmitted from the image generating device 10. The image forming unit 66 acquires the data of the display images from the communication unit 64 and formats the data into a final display form.

That is, the resolutions of the display images transmitted are determined on the basis of additional data, and an interpolation process is executed to adjust the resolutions of the display images to the resolution of the display panel. In a case where the resolution varies with the area, pixels are interpolated so as to be extended at an appropriate scale for each area. As the interpolation process, any of general methods may be employed. However, the resolution reduction rate in the present embodiment is limited to the degree that reduction rate is prevented from affecting viewing, on the basis of a decrease in human vision for moving bodies. Thus, the use of a relatively easy method is acceptable.

This enables a reduction in time needed for the interpolation process to allow an increase in latency until display to be prevented. Note that, when the display images transmitted from the image generating device 10 have a low resolution and a small size, the pixels may be interpolated in accordance with the resolution of the display panel to enlarge the image as described above or a black area may be provided around the display image with the size of the transmitted display image unchanged to adjust the display image according to the size of the display panel. The display unit 68 is constituted of the display panel, a driving circuit for the display panel, and the like to present final display images in front of the user. Note that, in a case where the head is not moving, the resolutions of the images transmitted from the image generating device 10 need not be adjusted, the data may be fed directly from the communication unit 64 to the display unit 68.

Figure 5:
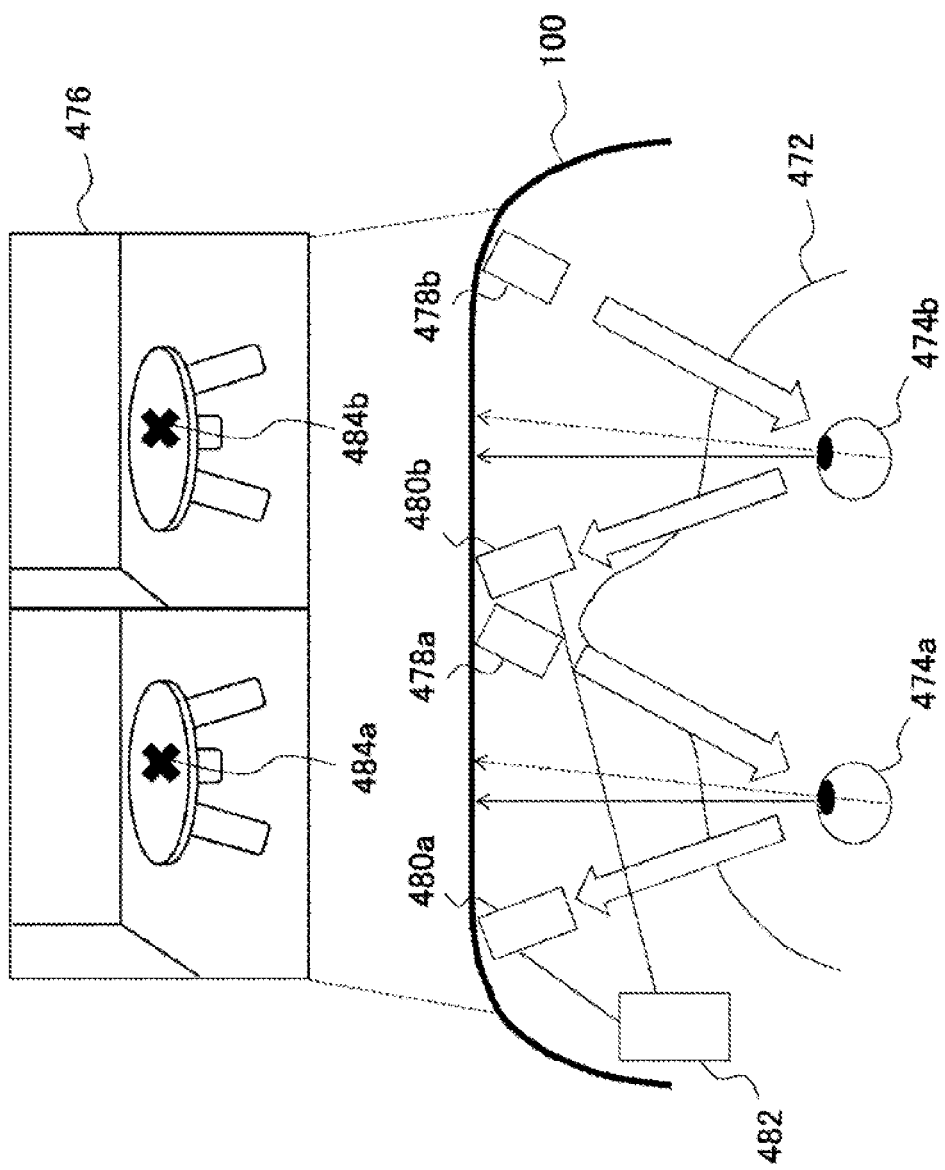
FIG. 5 is a diagram illustrating an example of a configuration in a case where a gaze point detector is introduced into the head mounted display in Embodiment 1.

FIG. 5 illustrates an example of a configuration in which the gaze point detector is introduced into the head mounted display 100. The lower portion of FIG. 5 schematically illustrates the head mounted display 100 and a head 472 of a user wearing the head mounted display 100. A display image 476 as illustrated in the upper portion of FIG. 5 is displayed on the head mounted display 100, and the user is looking at the display image 476 with a left eye 474a and a right eye 474b. Here, as the gaze point detector, infrared light-emitting diodes (LEDs) 478a and 478b, infrared cameras or position sensitive detector (PSD) sensors 480a and 480b, and an image analysis device 482 are provided.

The infrared LEDs 478a and 478b radiate infrared rays to the left and right eyes 474a and 474b of the user. The infrared cameras or PSD sensors 480a and 480b capture images of the user's left and right eyes 474a and 474b and supply corresponding data to the image analysis device 482. The image analysis device 482 determines, from the captured images of the left and right eyes, a position on the cornea where the infrared ray has been reflected and the position of the pupil, to determine the user's lines of sight on the basis of the resultant positional relationship. This method has been put to practical use in the field of line-of-sight detecting technologies as a corneal reflex method. Note that the method for detecting the lines of sight is not limited to this and that any of general methods may be employed, for example, a technology involving capturing the left and right eyes with a visible light camera and determining the lines of sight on the basis of a positional relationship between the inner corner of the eye and the iris in the captured images.

The image analysis device 482 detects the position coordinates of intersections 484a and 484b, as the user's gaze points, between the thus detected lines of sight and the display panel on which the display image 476 is being displayed. The information regarding the position coordinates of the gaze points is transmitted to the image generating device 10, and the data acquiring unit 50 of the image generating device 10 receives the information. The resolution control unit 54 divides the image plane into areas on the basis of the gaze points, and sets the resolution for each of the areas.

Figure 6:
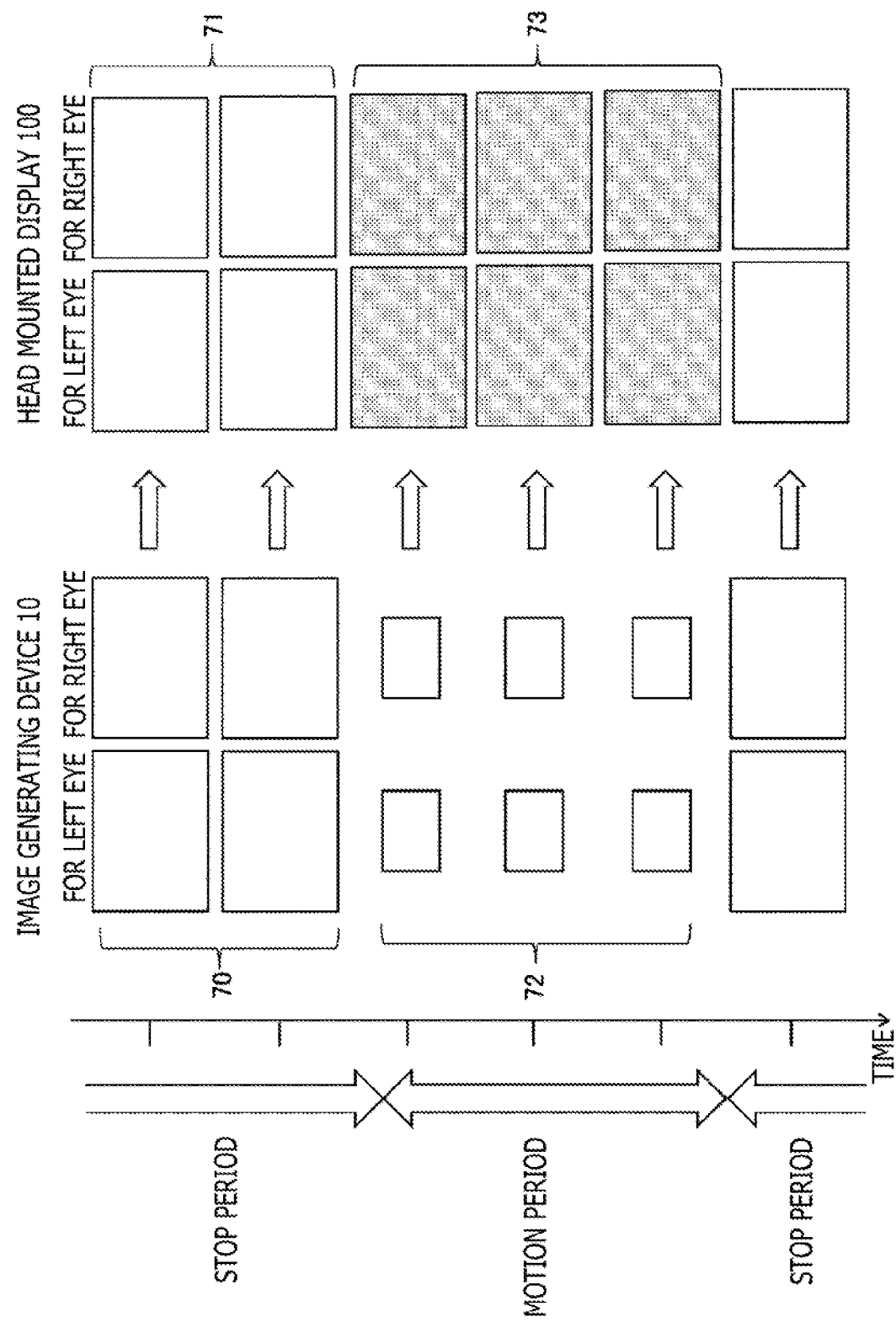
FIG. 6 is a diagram schematically illustrating temporal changes in frames constituting display images in Embodiment 1.

FIG. 6 schematically illustrates temporal changes in frames constituting display images. The vertical direction in FIG. 6 indicates time, and image frames generated/displayed in each time step as display images are expressed as rectangles. In this example, stereoscopic vision is assumed to be realized by generating/displaying an image for the right eye and an image for the left eye. However, the stereoscopic vision is not intended to be essential. First, during a "stop period" when the head is not moving, the image generating device 10 generates display images 70 at the resolution corresponding to the display resolution of the head mounted display. As a result, the generated display images are displayed on the head mounted display 100 without any change (display images 71).

When the "stop period" shifts to a "motion period" when the head is determined to be moving, the image generating device 10 reduces the resolution to generate display images 72 smaller in size than during the stop period. The head mounted display 100 enlarges the display images for display. As a result, displayed images 74 contain less high frequency components than the original images. In the figure, this state is indicated by hatching. Alternatively, as described above, a black area may be provided around the display images to match the display images in size to the display panel. Then, when the head is stopped again, the image generating device 10 sets the display images back to have the original resolution, while the head mounted display 100 displays the transmitted images without any change.

Figure 7:
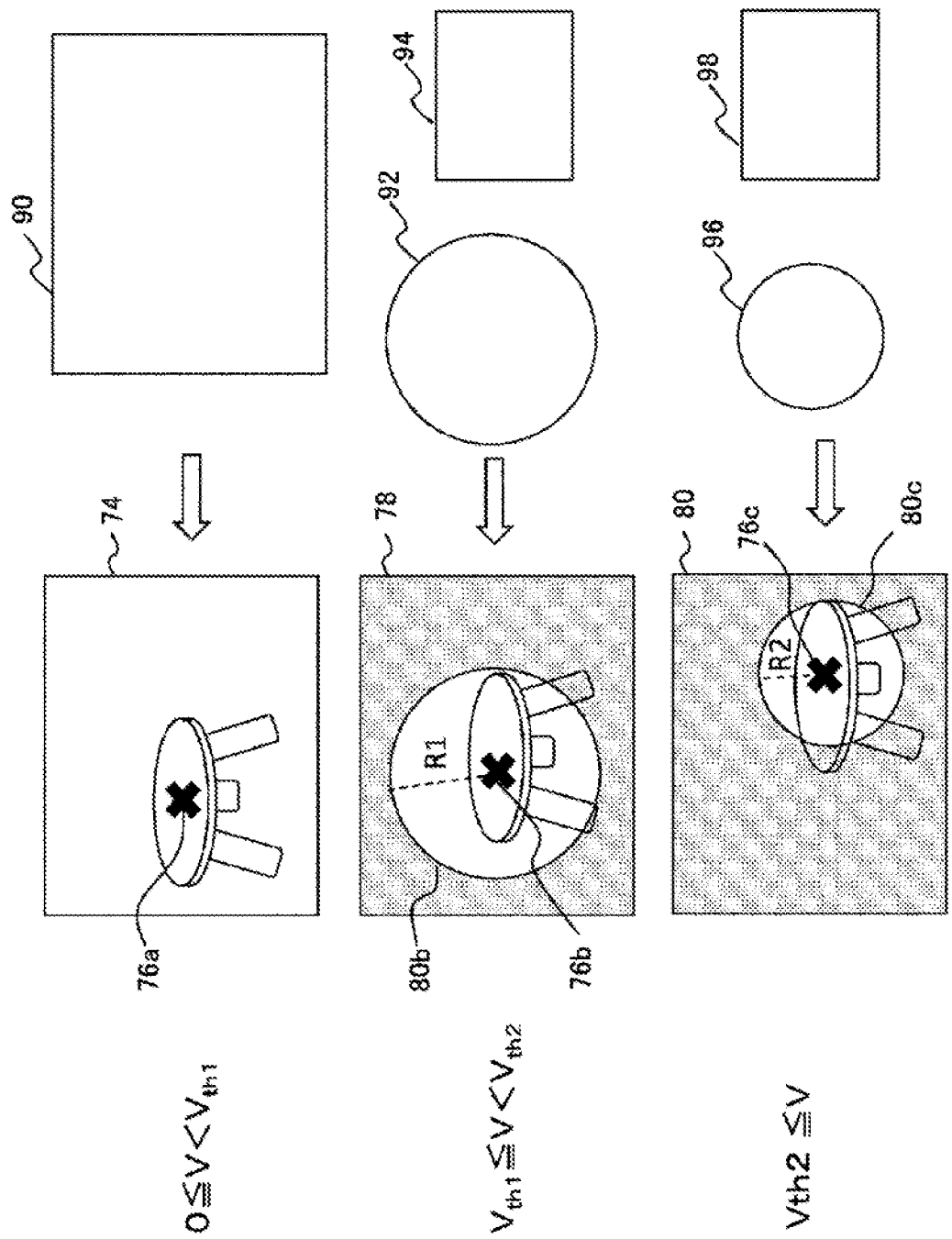
FIG. 7 is a diagram schematically illustrating an example of a relationship between the speed of motion of a head and an area in a case where resolution is varied according to the area in Embodiment 1.

FIG. 7 schematically illustrates an example of a relationship between the speed of motion of the head and the area in a case where the resolution is varied with the area. Note that the display image may actually be stereo images as illustrated in FIG. 6 but that FIG. 7 illustrates only one of the stereo images. Furthermore, an area in which the resolution is reduced is illustrated with hatching. Moreover, on the right of each display image, image data transmitted from the image generating device 10 to display the display image is illustrated by a graphic representing the shape and size of the data.

First, an upper speed limit at which the head is regarded as not moving is designated as a first threshold $V_{th1}$. When an actual speed V is within a range $0 \le V < V_{th1}$, the entire image is set to have a standard resolution regardless of the position of a gaze point 76a as in an image 74. Here, the standard resolution is, for example, the same as the display resolution of the head mounted display 100. In this case, the image generating device 10 transmits the data of an image 90 expressing the entire display image in a size corresponding to the standard resolution.

On the other hand, an upper speed limit at which the head is regarded as moving but at a low speed is designated as a second threshold $V_{th2}$ ($V_{th2} > V_{th1}$). When the actual speed V is within a range $V_{th1} \le V < V_{th2}$, a gaze area 80b centered at a gaze point 76a is set to have the standard resolution, with an area outside the gaze area 80b set to have a lower resolution, as in an image 78. In the illustrated example, the gaze area 80b is shaped like a circle with a radius R1. In this case, the image generating device 10 transmits the data of an image 92 expressing only the gaze area 80b at the standard resolution and the data of an image 94 expressing the entire display image in a size that is smaller than the standard size and that corresponds to the lower resolution.

Note that the image 92 of the gaze area 80b transmitted by the image generating device 10 may actually be a rectangle circumscribing the gaze area 80b. Alternatively, the gaze area 80b itself may be a rectangle. The image forming unit 66 of the head mounted display 100 enlarges the image 94 of the entire area having the smaller size and synthesizes the image 92 of the gaze area 80b with the image 94 to generate an image 78. At this time, to smoothly connect the image of the gaze area 80b to the image of the area outside the gaze area 80b, a boundary portion is desirably subjected to alpha blending.

Within a range $V_{th2} \le V$ where the head is regarded as moving at a high speed, as in an image 80, a gaze area 80c centered at a gaze point 76c is set to have the standard resolution, with an area outside the gaze area 80c set to have a lower resolution. Here, the gaze area 80c is set smaller in size than the gaze area 80b in the image 78 in low-speed conditions. In the illustrated example, the gaze area 80c is shaped like a circle with a radius R2 (R2<R1). At this time, the image generating device 10 transmits the data of an image 96 expressing only the gaze area 80c at the standard resolution and the data of an image 98 expressing the entire display image in a size that is smaller than the standard size and that corresponds to the lower resolution. The image 96 of the gaze area in high-speed conditions is smaller in size than the image 92 in the low-speed conditions.

Furthermore, on the basis of the setting of the resolution, the entire image 98 in the high-speed conditions may have a smaller size than or the same size as that of the image 94 in the low-speed conditions. Note that, in this example, two thresholds are set for the speed of the motion but that three or more thresholds may be set or one threshold may be set. Furthermore, by setting boundaries in a plurality of stages according to the distance from the gaze point as described above, the resolution may be varied among three or more areas. Moreover, the resolution reduction rate for each area may be varied according to the speed range.

In qualitative terms, the area for which the resolution is reduced is extended with increasing speed. Thus, the size of data to be transmitted can be reduced with increasing speed. On the other hand, the resolution of the object being gazed is maintained so that, in a case of moving while gazing a certain object, the user can be prevented from feeling uncomfortable due to a decrease even in the resolution of the object being gazed. Furthermore, human beings have the property that the effective visual field narrows with increasing speed of the motion, and thus, narrowing the high-resolution area allows the amount of data to be maximally reduced by a more natural change.

The aspect as illustrated in the in the drawings produces effects as described below. That is, the human beings have the property that the peripheral visual field more keenly perceives motion than the effective visual field around the gaze point (for example, Joseph S. Lappin, et al. "Spatial and temporal limits of motion perception across variations in speed, eccentricity, and low vision," Journal of Vision, 2009, 9(1), 30, p. 1-14). In the head mounted display, unlike in the case of the real visual field, a high-resolution image is presented in the peripheral visual field in spite of the motion of the head, leading to a possible excessive stimulus to the inside of the brain due to synergy with the keen perception. By intentionally reducing the resolution of a surrounding area to decrease the amount of information for the peripheral field, in which relatively large motion is likely to take place, as in the present embodiment, a display form unlikely to cause VR sickness or eyestrain can be achieved.

Note that, in the illustrated example, the entire image 74 has the standard resolution in a state where the head is not moving but that, in this stage, the display image may be constituted of a standard-resolution area including the gaze point 76a and a low-resolution area outside the standard-resolution area. In this case, the standard-resolution area is set narrower during the period when the head is moving than during the period when the head is not moving. As described above, the peripheral visual field is viewed with limited vision than the effective visual field. Furthermore, in a case where the head mounted display 100 enlarges the visual field using a lens, the peripheral visual field is viewed structurally at a low resolution and gains few benefits from an increased resolution of the display image. Accordingly, by also reducing the resolution of the surrounding area while the head is not moving, the amount of data transmitted can further be reduced with the adverse effect on visibility suppressed.

Moreover, in the illustrated example, the gaze areas 80b and 80c at the standard resolution are circular. However, the gaze areas 80b and 80c are not intended to be limited to this shape but may each be shaped like a rectangle or an ellipse with the center of gravity corresponding to the gaze point or may each be an area of the image of the object being gazed. Furthermore, the position or shape of the standard-resolution area may be adaptively varied according to the direction of motion of the head. Furthermore, instead of the configuration in which the resolution varies between the gaze area and the other areas, a configuration may be provided in which an area desired to be gazed in terms of the contents of the image has a higher resolution than the other areas. For example, in terms of the contents of games, a higher resolution may be set for areas where an important object is expressed, areas in the virtual world located in a traveling direction of the user, and a central area of the visual field.

Alternatively, in a situation where user operations are accepted via an unillustrated input device, areas set to have a higher resolution may be determined according to the objects on which the operations are to be performed, or the operations. Furthermore, when the resolution is reduced, the resolution for each area is determined to set, to a predetermined value, the bit rate of the data to be transmitted. That is, the following is appropriately determined to set the amount of data in the entire image to a predetermined value: a combination of the size of the gaze area or the like for which the resolution is set higher than for the other areas and the resolutions set for the gaze area or the like and for the other areas.

Figure 8:
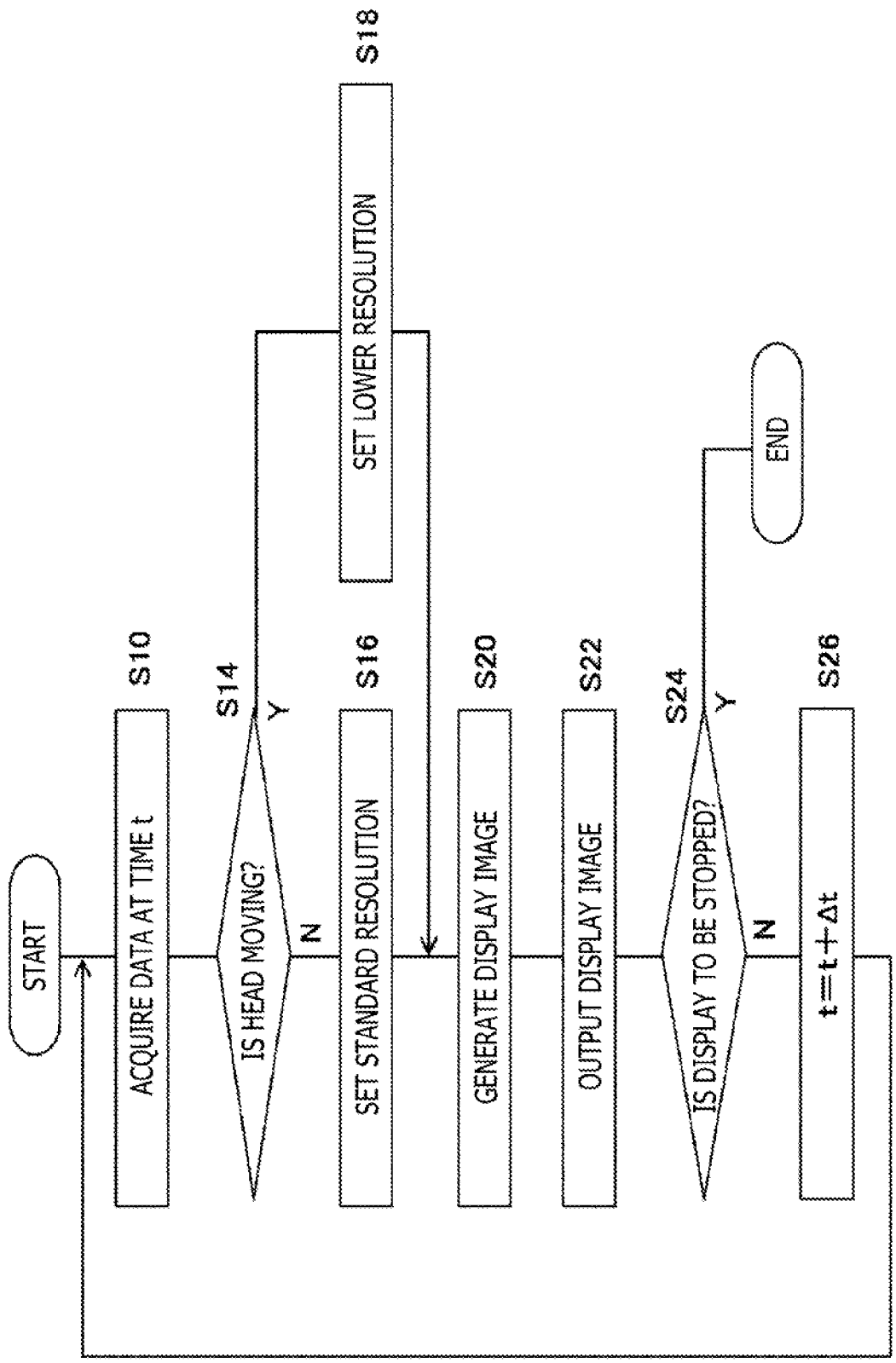
FIG. 8 is a flowchart illustrating a processing procedure in which the image generating device in Embodiment 1 generates and outputs a display image at a resolution corresponding to a motion of a user's head.

Now, operation of the image generating device 10 that can be implemented by the above-described configuration will be described. FIG. 8 is a flowchart illustrating a process procedure in which the image generating device 10 generates and outputs display images at a resolution corresponding to the motion of the user's head. The flowchart is started when, for example, the user puts on the head mounted display 100 and inputs, to the head mounted display 100, a request to start an electronic content involving image display on the head mounted display 100. In response, in the head mounted display 100, image capturing and measurement by the various sensors are started. Moreover, the gaze point detector may start measuring the position coordinates of the gaze point.

First, the data acquiring unit 50 of the image generating device 10 acquires, from the head mounted display 100, at least either the data of captured images captured at a current time t and sensor measured values measured at the current time t (S10). At this time, the position coordinates of the gaze points at the time t are acquired as needed. Then, the motion detecting unit 52 analyzes the information acquired to determine whether or not the head is moving (S14). In actuality, as described above, the data acquiring unit 50 determines whether or not the angular velocity or translational moving velocity of the head exceeds a predetermined threshold (in the above-described example, the first threshold Vth1).

In a case where the data acquiring unit 50 determines that the head is not moving, the resolution control unit 54 sets the resolution at the time t as a standard resolution and notifies the image generating unit 56 of the setting (N in S14, S16). As described above, even in the standard conditions, the resolution of the outside of the area within the predetermined range including the gaze point may be reduced to prevent an increase in the amount of data transmitted. In a case where the data acquiring unit 50 determines that the head is moving, the resolution control unit 54 sets a lower resolution for at least a part of the display image and notifies the image generating unit 56 of the setting (Y in S14, S18).

At this time, as described above, further another threshold determination may be performed to adjust, according to the speed range, the resolution reduction rate or the size of the area for which the resolution is to be reduced. The image generating unit 56 generates, at the resolution complying with those settings, display images with visual fields corresponding to the user's lines of sight determined at the time t (S20). The image generating unit 56 further creates, as additional data, the resolutions of the display images generated and information regarding association between the area and the resolution.

The output unit 58 performs, for example, appropriate formatting and compression-coding of the data of the generated display imaged, and transmits the data to the head mounted display 100 along with the additional data (S22). In a case where, in S14, the head is determined to be moving, the resolution may be substantially reduced by a method of, for example, excluding high frequency components from a transmission target in a compression process in S22. While the display need not be stopped due to the progress of a game or a user operation (N in S24), the data at the next time t=t+Δt is acquired (S26, S10), and the processing from S14 to S22 is repeated. In a case where the display needs to be ended, all of the processing is ended (Y in S24).

According to the present embodiment described above, in the image generating device generating images to be displayed on the head mounted display, whether or not the head of the user wearing the head mounted display is moving is monitored, and the resolution of at least a partial area is reduced while the head is moving. This allows artificial creation of a change in display compatible with the property of human beings that the vision is limited when a moving object is viewed, and enables a reduction in the amount of data transmitted from the image generating device to the head mounted display.

As a result, power needed for data transmission can be reduced, thus enabling a reduction in the capacity of built-in batteries even in a case where the head mounted display communicates wirelessly with the image generating device. Accordingly, a light and user-friendly head mounted display can be implemented. Furthermore, the head can be prevented from feeling uncomfortable due to heat generated from a power supply. With wireless communication, the motion of the head mounted display is expected to degrade a communication status, thus limiting transmission bands. By preliminarily extracting minimum data needed for a period when the head is moving as described above, the display images can be prevented from being affected by degradation of the communication status.

Furthermore, for the area within the predetermined range from the gaze point, the resolution reduction rate is kept lower than for the area outside this area or the resolution is inhibited from being reduced. This allows high-resolution images to be presented for the object being gazed even in a case where the head is moving. Furthermore, by intentionally reducing the resolution of the peripheral visual field, which keenly perceives motion, eyestrain and an excessive stimulus to the inside of the brain can be suppressed. Moreover, a decrease in resolution can be made difficult to feel by adjusting, according to the speed of motion of the head, the resolution reduction rate or the boundary of the area where the resolution is reduced.

Embodiment 2

Figure 9:
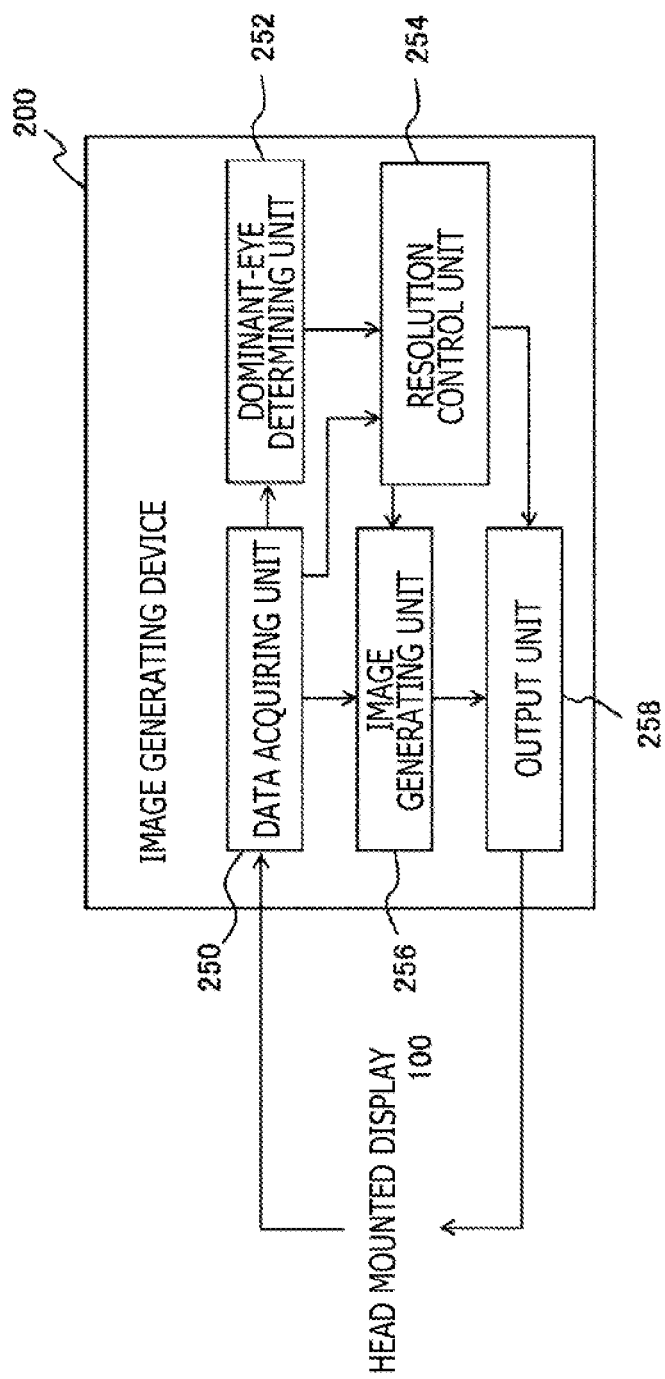
FIG. 9 is a diagram illustrating a configuration of functional blocks of an image generating device in Embodiment 2.

In Embodiment 1, the resolution is varied depending on whether or not the user's head is moving or according to the speed of motion of the head. In the present embodiment, the resolution is varied between an image for the left eye and an image for the right eye, the images corresponding to stereo images to be displayed. FIG. 9 illustrates a configuration of functional blocks of an image generating device 200 in the present embodiment. Description of processing common to Embodiment 1 is hereinafter appropriately omitted. The image generating device 200 has an internal circuit configuration illustrated in FIG. 3, and the head mounted display 100 connected to the image generating device 200 may be configured similarly to the head mounted display illustrated in FIG. 4. However, the measuring unit 62 of the head mounted display 100 is assumed to include a gaze point detector as illustrated in FIG. 5.

The image generating device 200 includes a data acquiring unit 250 for acquiring data needed for processing from the head mounted display 100, a dominant-eye determining unit 252 for determining one of the left and right eyes to be a dominant eye, a resolution control unit 254 for setting the resolutions of stereo images in accordance with the determination, an image generating unit 256 for generating display images at the determined resolution, and an output unit 258 for appropriately formatting the data of the display images and outputting the data to the head mounted display 100.

The data acquiring unit 250 functions similarly to the data acquiring unit 50 in FIG. 4 to acquire data needed for processing from the head mounted display 100 at a predetermined rate. However, the data acquired includes information related to the position coordinates of the gaze point from the gaze point detector. The dominant-eye determining unit 252 determines one of the left and right eyes to be the dominant eye on the basis of changes in the position coordinates of the gaze point. Human beings are known to inherently dominantly use one of the left and right eyes when viewing an object. In general, the eye mainly used is referred to as a dominant eye, and the opposite eye is referred to as an undominant eye.

The dominant eye may be changed depending on the situation. Various examination methods have been proposed to determine the dominant eye. However, in the present embodiment, the dominant eye is determined on the basis of stability of the gaze point. In other words, the dominant eye in a broad sense is defined as one of the gaze points of the left and right eyes that moves more stably. The dominant-eye determining unit 252 holds the position coordinates of the gaze points obtained at the last predetermined time, evaluates the gaze points for stability, and determines one of the eyes involving higher stability to be the dominant eye. For evaluation of stability, any of general statistical methods may be used that include executing principal component analysis on the distribution of the position coordinates and determining standard deviation of the position coordinates.

The dominant-eye determining unit 252 may only determine the dominant eye when the head mounted display 100 starts image display or may constantly monitor stability of the gaze point, and on the basis of the result of the monitoring, determine the dominant eye as needed. Data associating the user with the dominant eye may be internally held, and fixed for each user. The resolution control unit 254 sets at least a part of the image for the undominant eye included in the displayed stereo images to have a lower resolution than the image for the dominant eye.

The image generating unit 256 functions similarly to the image generating unit 56 in FIG. 4 to generate display images at the resolution set by the resolution control unit 254 and at a display frame rate. The contents of the images and the manner of reducing the resolution are similar to the contents and the manner described in Embodiment 1. The output unit 258 functions similarly to the output unit 58 in FIG. 4 to appropriately format the data of the images generated and sequentially outputting the data to the head mounted display 100. At this time, for the resolution of each of the stereo images and in a case where the resolution is varied with the area, information related to the resolutions of the images such as data associating the area with the resolution is transmitted as additional data for each frame.

Figure 10:
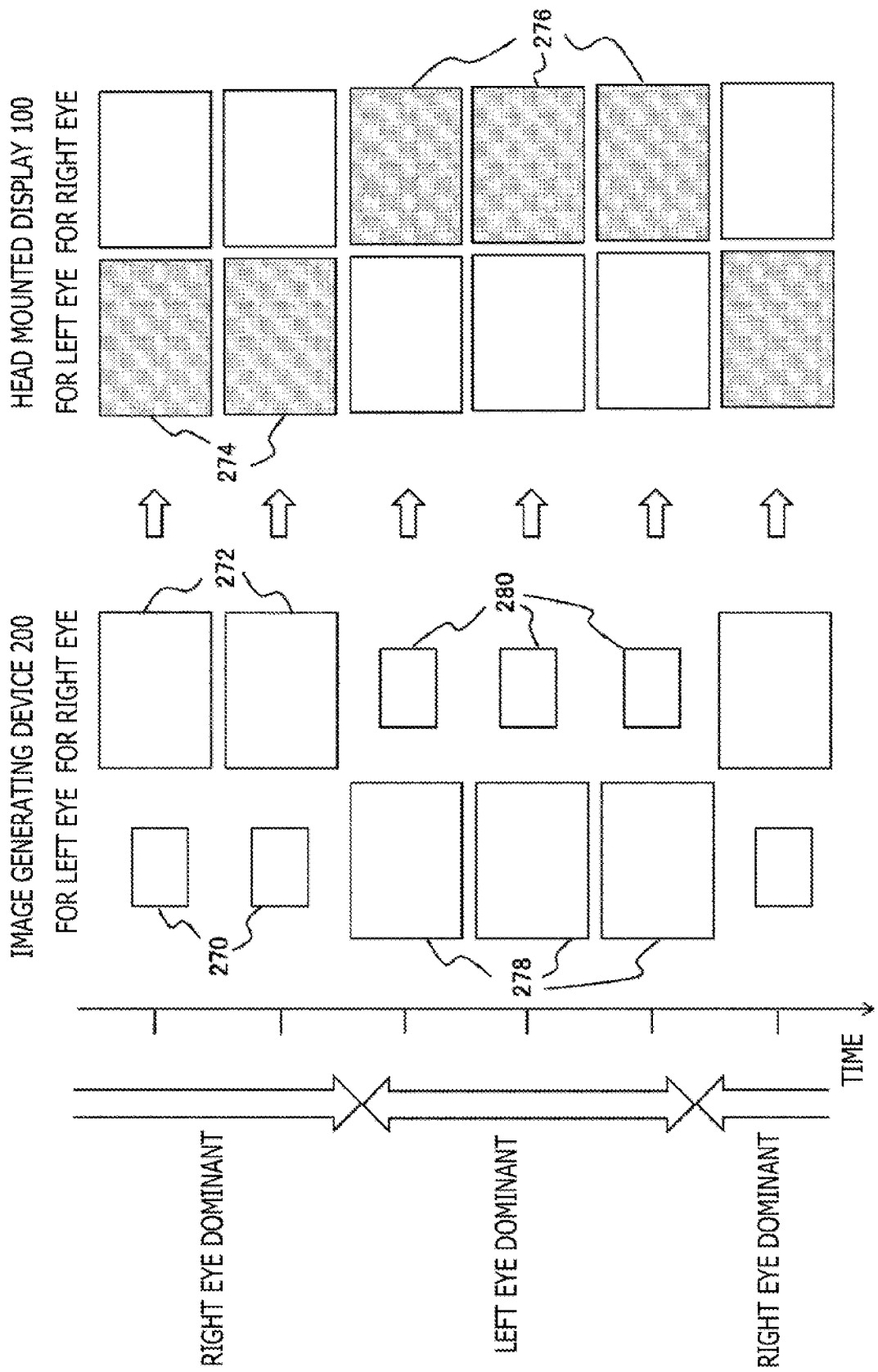
FIG. 10 is a diagram schematically illustrating temporal changes in frames constituting display images in Embodiment 2.

FIG. 10 schematically illustrates temporal changes in frames constituting display images. A manner of expressing FIG. 10 is similar to the manner of expressing FIG. 6. First, during a "right eye dominant" period when the dominant eye is the right eye, the image generating device 200 generates an image for the right eye 272 at a resolution corresponding to the display resolution of the head mounted display. On the other hand, as an image for the left eye, a display image 270 smaller in size than the image for the right eye is generated by reducing the resolution.

The head mounted display 100 receives such data and then displays the data for the right eye without any change, while enlarging the data for the left eye. As a result, the display image for the left eye 274 includes fewer high-frequency components than the original image. That is, stereo images are displayed that include different frequency components besides different viewpoints. In spite of this display, simultaneously viewing the images allows three-dimensional shapes to be perceived as usual due to reconstruction in the brain. The present inventor's experiments indicate that the stereoscopic vision is prevented from being affected even in a case where the resolution of one of the stereo images is approximately one-fourths of the resolution of the other. Accordingly, the amount of data to be transmitted can be reduced with little adverse effect on the stereoscopic vision, allowing an increase in power consumption to be prevented.

In a case where the right eye dominant period changes to a "left eye dominant" period in which the dominant eye is the left eye, the image generating device 200 reverses the magnitude relationship between the resolutions of the left and right images. That is, an image for the left eye 278 is generated at a resolution corresponding to the display resolution of the head mounted display. As an image for the right eye, a display image smaller in size than the image for the left eye is generated by reducing the resolution. As a result, in the head mounted display 100, the image for the left eye is displayed without any change, while an enlarged image 276 is displayed as the image for the right eye.

In a case where the left eye dominant period changes back to the "right eye dominant," the magnitude relationship between the resolutions of the left and right images is reversed again. The manner of reducing the resolution is similar to the manner described in Embodiment 1; the resolution of the entire image may be uniformly reduced or the resolution may be reduced except for the area within the predetermined range from the gaze point as illustrated in FIG. 7. Note that the resolution of the surrounding area may be reduced even in the display image for the dominant eye and that the size of the area for which the resolution is reduced may be set larger for the image for the undominant eye than for the image for the dominant eye.

Reducing the resolutions of one of the stereo images as described above produces the effect of preventing eyestrain in addition to the effect of reducing the amount of data transmitted. That is, displaying a detailed image in front of the undominant eye causes excess amount of information to also enter the undominant eye even though an appropriate balance is otherwise maintained by a natural difference in the amount of acquired information between the dominant eye and the undominant eye. This results in eyestrain or low visibility.

As is well known in the fields of vision correction technologies and the like, excessive correction of the vision of the undominant eye may pose a problem such as eyestrain or anisometropia. Furthermore, a known monovision method is a method of correcting presbyopia by providing far vision correction for the dominant eye while providing near vision correction for the undominant eye. By adjusting, between the left and right eyes, the amount of information presented as images while taking a difference in function between the left and right eyes into account, a display form can be implemented that is easier to see and that is less fatiguing. A timing to switch the magnitude relationship between the left and right images in terms of resolution may be a point in time when the dominant eye is switched on the basis of stability of the gaze point or an end point of a content indicating switching between scenes. By adjusting the timing according to the display content as in the latter case, seamless switching can be achieved on the user's perception.

Figure 11:
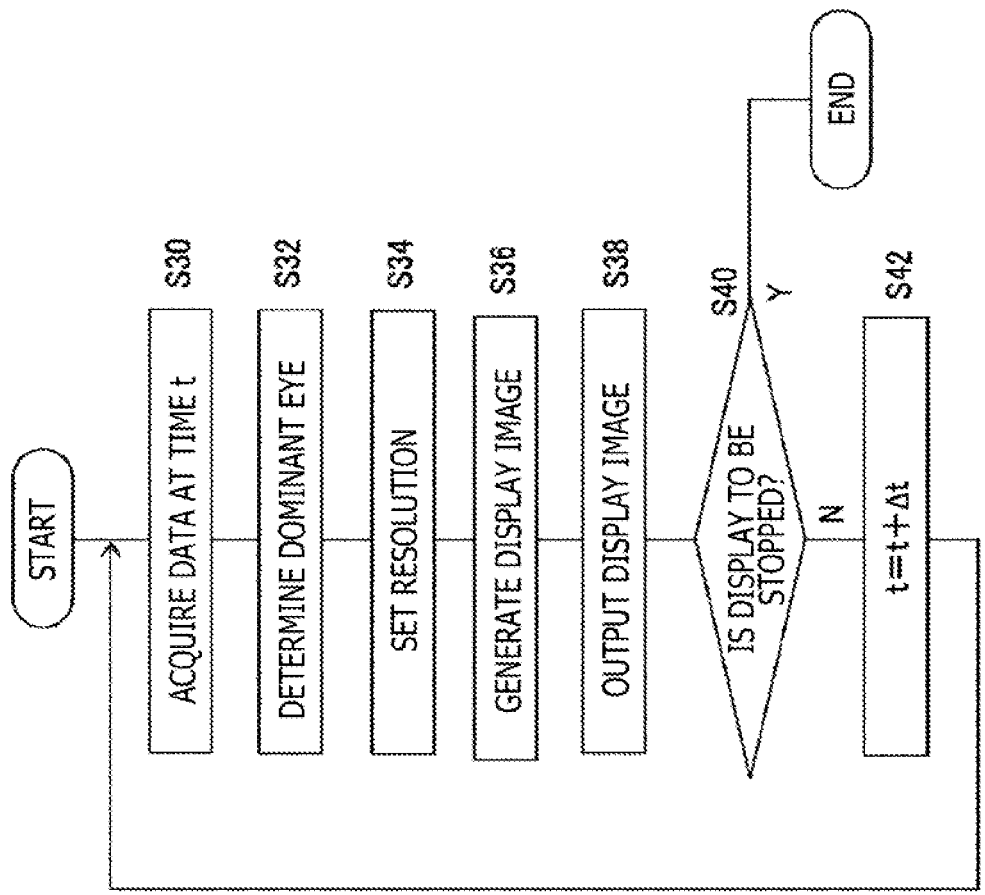
FIG. 11 is a flowchart illustrating a processing procedure in which the image generating device in Embodiment 2 generates and outputs display images with the resolutions of stereo images varied between a dominant eye and a non-dominant eye.

Now, operation of the image generating device 200 that can be implemented by the above-described configuration will be described. FIG. 11 is a flowchart illustrating a process procedure in which the image generating device 200 creates a difference in resolution between the stereo images on the basis of the dominant eye/undominant eye to generate and output display images. The flowchart is started when, for example, the user puts on the head mounted display 100 and inputs, to the head mounted display 100, a request to start an electronic content involving image display on the head mounted display 100.

First, the data acquiring unit 250 of the image generating device 200 acquires, from the head mounted display 100, data related to the position coordinates of the user's gaze points obtained at the current time t (S30). At this time, data needed to generate display images, that is, the data of captured images and sensor measured values, are appropriately acquired. The dominant-eye determining unit 252 evaluates the position coordinates of the gaze points for stability on the basis of a predetermined reference to determine one of the left and right eyes involving higher stability to be the dominant eye (S32).

Then, the resolution control unit 254 sets the standard resolution for the display image for the dominant eye, while setting a lower resolution for at least a part of the display image for the undominant eye. The resolution control unit 254 then notifies the image generating unit 256 of the setting (S34). The image generating unit 256 generates, at the resolution complying with the settings, display stereo images with visual fields corresponding to the user's line of sights determined at the time t (S36). The image generating unit 256 further creates, as additional data, the resolutions of the display images generated and information regarding association between the area and the resolution.

The output unit 258 performs, for example, appropriate formatting and compression-coding of the data of the generated display images, and transmits the data to the head mounted display 100 along with the additional data (S38). As is the case with Embodiment 1, the resolution of the image for the undominant eye may be substantially reduced by excluding high frequency components in the compression process. While the display need not be stopped due to the progress of a game or a user operation (N in S40), the data at the next time t=t+Δt is acquired (S42, S30), and the processing from S32 to S38 is repeated. In a case where the display needs to be ended, all of the processing is ended (Y in S40).

According to the present embodiment described above, the position coordinates of the user's gaze points with respect to the stereo images for stereoscopic vision are acquired, the stereo images being displayed on the head mounted display. The image generating device for generating display images determines the eye involving more stable movement of the gaze point to be the dominant eye, and reduces the resolution of at least a partial area of the display image for the undominant eye. This enables a reduction in the amount of data to be transmitted from the image generating device to the head mounted display without impairing the three-dimensional effect of the data.

As a result, power needed for data transmission can be reduced, thus enabling a reduction in the capacity of built-in batteries even in a case where the head mounted display communicates wirelessly with the image generating device. Accordingly, a light and user-friendly head mounted display can be implemented. Furthermore, the head can be prevented from feeling uncomfortable due to heat generated from the power supply. Moreover, the amount of information entering the undominant eye the use of which is inherently suppressed is reduced, and thus, the present embodiment is effective in, for example, preventing eyestrain, mitigating difficulty in stereoscopic vision, and preventing sickness.

The present invention has been described on the basis of the embodiments. The above-described embodiments are illustrative, and as understood by those in the art, various modifications can be made to the combination of components or processes of the embodiments, and such modifications are also within the scope of the present invention.

Figure 12:
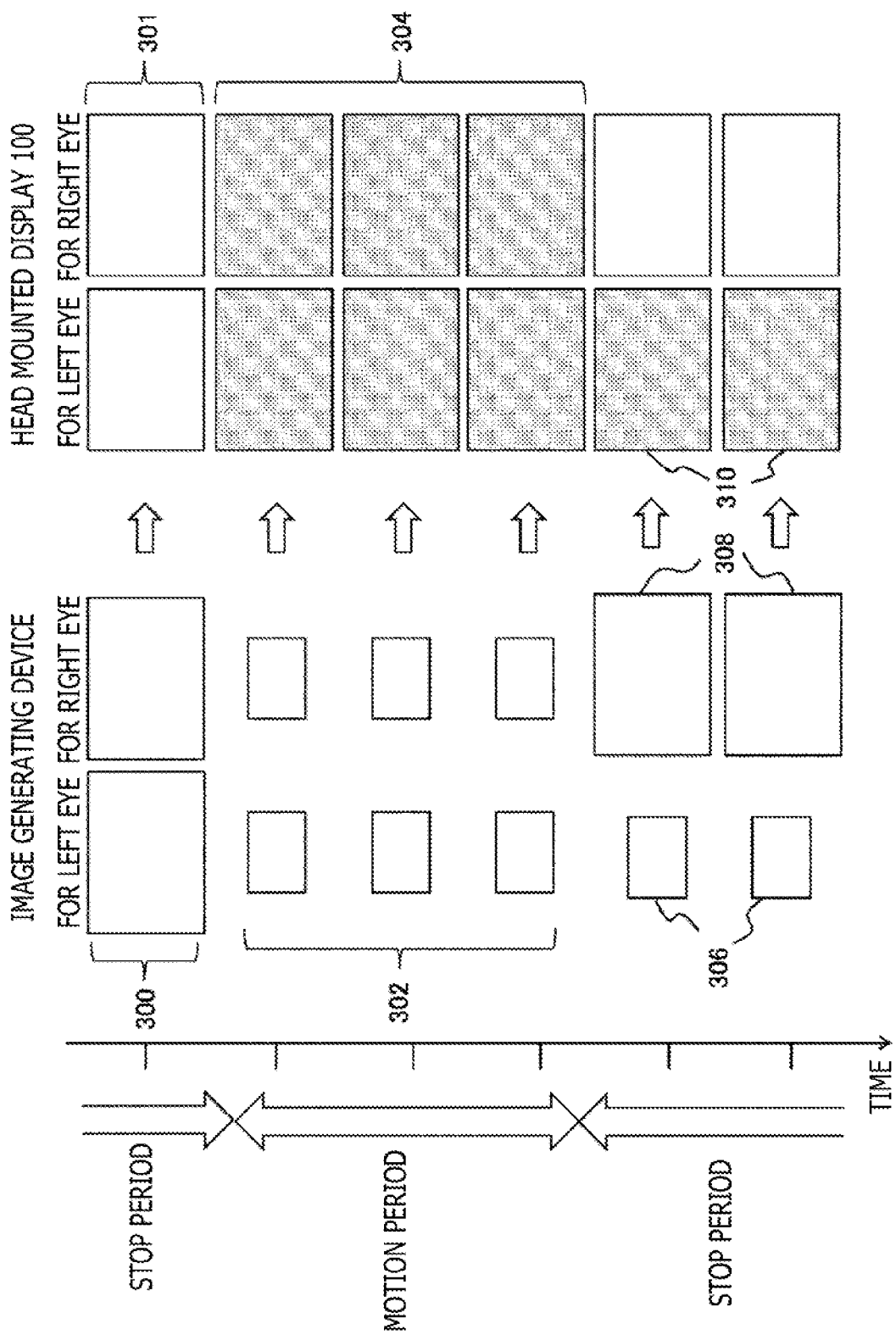
FIG. 12 is a diagram schematically illustrating temporal changes in frames constituting display images when a process of reducing the resolution according to the motion of the head is combined with adjustment of the resolution based on dominance of the eye.

For example, Embodiment 1 and Embodiment 2 may be combined. FIG. 12 schematically illustrates temporal changes in frames constituting display images when a process of reducing the resolution according to the motion of the head is combined with adjustment of the resolution based on the dominance of the eye. A manner of expressing FIG. 12 is similar to the manner of expressing FIG. 6 or FIG. 10. First, during the "stop period" when the head is not moving, as described in Embodiment 1, the image generating device generates display images 300 at the resolution corresponding to the display resolution of the head mounted display. As a result, the display images generated are displayed on the head mounted display 100 without any change (display images 301).

In a case where the stop period transitions to the "motion period" when the head is determined to be moving, the image generating device reduces the resolution to generate display images 302 smaller in size than the display images during the stop period. The head mounted display 100 enlarges the display images 302 for display (display images 304). In a case where the head is stopped again, the resolution of one of the left and right display images is returned to the standard value as is the case with Embodiment 2. In the illustrated example, only the resolution of an image for the right eye 308 is returned to the original value, whereas a display image for the left eye 306 remains to have the lower resolution.

This allows the amount of data to be transmitted to be prevented from increasing immediately after the head is stopped. Degradation of a communication state can be suppressed that results from a rapid change in transmission band used, and latency until display can also be inhibited. Furthermore, as described in Embodiment 1 and Embodiment 2, an increase in the amount of data to be transmitted can be prevented with little adverse effect on perception of images, and power consumption can be reduced.

For the target image the resolution of which is to be returned to the original value when the head is stopped, the gaze points may be evaluated for stability at the current point in time, and the target image may be determined to be one of the images involving higher stability, or the target image may be fixed for each user regardless of the situation or may be set in common. The aspect in which the target image is determined regardless of the situation of the gaze points can be implemented by the configuration of the image generating device 10 illustrated in FIG. 4. By providing the image generating device 10 with the dominant-eye determining unit 252 illustrated in FIG. 9, the aspect can be implemented in which the dominant eye is determined on the basis of stability of the gaze points and in which the resolution for the dominant eye is returned to the original value.

Furthermore, one of the left and right display images may be set to have a lower resolution only for a predetermined time after the head is stopped, to suppress a rapid increase in the amount of data transmitted, and both of the stereo images may finally be set to have the standard resolution. Alternatively, Embodiment 2 may be continuously introduced during the head stop period. Moreover, a difference in resolution may be created between the left and right display images during the period when the head is moving. That is, the resolution of one of the display images is further reduced below the resolution of the other display image. Even this is unlikely to impair the stereoscopic vision as described in Embodiment 2. As a result, the amount of data to be transferred can further be reduced without the user's awareness.

Furthermore, in Embodiment 1, the resolution is reduced or returned to the original value with focus placed on the speed of the head. However, instead of the speed of the head, the stability of the gaze points described in Embodiment 2 may be utilized. Specifically, the motion detecting unit 52 monitors the motion of the left and right gaze points, and the resolution control unit 54 sets the standard resolution when the gaze points are located in the same area within a predetermined range in the display image for a predetermined time or more. At this time, the resolution may also be varied between this area and the other areas. Then, the resolution is reduced in a case where at least one of the left and right gaze points moves out of the area or the state in which the gaze point is located out of the area continues for a predetermined time or more. Thus, regardless of the motion of the head, with the viewpoints not fixed, an increase in the size of data to be transmitted can be prevented with little adverse effect on visibility. Furthermore, the motion detecting unit 52 may monitor both the motion of the head and the stability of the viewpoints to reduce the resolution when determining that the head is moving or the viewpoints are unstable.

Moreover, in Embodiments 1 and 2, the aspects have been described that focus on a reduction in the resolutions of the display images on the basis of the motion of the head or the stability of the gaze points. However, the variation made to the display images may be another parameter. In this case, instead of the resolution control unit 54 or 254, a parameter control unit for controlling this parameter may be provided. For example, the parameter control unit may reduce a compression rate used for transmission from the image generating device 10 or decrease a bit depth as a pixel value. Furthermore, for image data in which each pixel is constituted of a plurality of channels, the resolution of a predetermined channel may be reduced. For example, for the data of a color image in red, green, and blue (RGB), red and blue may be set to have a lower resolution than green. In this case, at the time of display, the resolution may be made uniform among the channels by, for example, enlarging, by interpolation, the image data of the channel with the lower resolution. Furthermore, the contrast or frame rate of images may be reduced, or a gamma curve may be changed to narrow a brightness range.

In a case where the above-described aspect is applied to Embodiment 2, for example, the compression rate may be set higher for one of the image for the left vision and the image for the right vision than for the other, or the frame rate may be set lower for one of the image for the left vision and the image for the right vision than for the other. Furthermore, the bit depth as a pixel value may be set smaller for one of the image for the left vision and the image for the right vision than for the other. At this time, no difference may be created for the pixel values for a particular channel such as green, and the bit depth may be set lower only for the pixel values of the other channels such as red and blue to more appropriately suppress the adverse effect on display. In a case where such a parameter is varied, the amount of variation may be varied between the gaze area and the other areas. Furthermore, the parameter control unit may combine at least any of these parameters with the resolution and vary the combination.

In any case, by adjusting these parameters so as to reduce the size of transmitted data during the period when the head is moving or the gaze points are not stable, a favorable environment for image viewing can be provided with the adverse effect on appearance minimized. Furthermore, even parameters not contributing to data size reduction are expected to produce new visual effects by reconstructing, in the brain, images viewed with the left and right eyes and appearing to have a difference. For such a purpose, various parameters other than those described above which parameters are related to image data can be used to create a difference between the left and right images.

Furthermore, in Embodiment 2, the eye with the gaze point moving more stably is determined to be the dominant eye, and the display image for the opposite eye is set to have a lower resolution. On the other hand, the image for which the resolution is to be reduced may be determined according to any other rule. For example, one of the left and right images may be determined to be the image for which the resolution is to be reduced regardless of the stability of the gaze point. Moreover, the magnitude relationship in terms of resolution may be forcibly switched at predetermined time intervals or at predetermined timings such as switching points between scenes of a content to be displayed.

In such a case, one of the images may be entirely set to have a lower resolution or the area the resolution of which is to be reduced may be limited depending on the position of the gaze point. For example, during the period when the gaze points of the left and right eyes are located at the same position on the images, an area within a predetermined range including this position is set to have the standard resolution, whereas the other areas are set to have a lower resolution. Alternatively, during a period when the gaze points of the left and right eyes remain within the same range on the images for a predetermined time or more, the area corresponding to the range is set to have the standard resolution, whereas the other areas are set to have a lower resolution. These situations mean that the viewpoints are fixed in a certain area, and thus, by returning the resolution to the original value in response to occurrence of such an area, the adverse effect on visibility can be minimized.

Human beings have the property of viewing an object by preferentially using the eye capable of viewing the object in further detail. Accordingly, as described above, in a case where a certain magnitude relationship is established for the resolutions of the images for the left and right eyes, the eye for which a high-resolution image is presented is naturally used. This reflects induction of the dominant eye due to the resolution of the display image. Switching the high-resolution image at predetermined timings allows the eye mainly used to be switched, and thus, eyestrain is less likely to occur than in a case where only one of the eyes is overused. As a result, images that are less fatiguing and that provide comfortable stereoscopic vision can be implemented with a small amount of transmitted data. The parameter for the switching between the left and right eyes at the predetermined timings is not limited to the resolution, but any of the above-described compression rate, frame rate, bit depth, and the like may be used. Furthermore, even simultaneous switching of any two or more of these parameters produces effects similar to the above-described effects.

Additionally, in Embodiments 1 and 2, the image generating device exclusively adjusts the resolution. On the other hand, in a case where the head mounted display transmits the data of captured images to the image generating device, the camera of the head mounted display may adjust the resolution. That is, the process of reducing the resolution is executed in a stage where the data of captured images to be transmitted to the image generating device is generated from what is called RAW images detected by an array of imaging elements.

The reduction of the resolution in this case may involve a reference such as the motion of the head or the dominant eye described in Embodiment 1 or 2. At this time, the image generating device 10 or 200 transmits the results of setting of the resolution by the resolution control unit 54 or 254, to the head mounted display 100 through the output unit 58 or 258. In response, the imaging unit 60 of the head mounted display 100 generates data of captured images at the resolution complying with the setting, and transmits the data to the image generating device 10 or 200 through the communication unit 64. This enables a reduction not only in the amount of data transmitted from the image generating device to the head mounted display but also in the amount of data transmitted from the head mounted display to the image generating device, allowing an increase in power consumption to be more appropriately prevented.

REFERENCE SIGNS LIST

10 Image generating device, 23 CPU, 24 GPU, 26 Main memory, 50 Data acquiring unit, 52 Motion detecting unit, 54 Resolution control unit, 56 Image generating unit, 58 Output unit, 60 Imaging unit, 62 Measuring unit, 64 Communication unit, 66 Image forming unit, 68 Display unit, 100 Head mounted display, 110 Stereo camera, 250 Data acquiring unit, 252 Dominant-eye determining unit, 254 Resolution control unit, 256 Image generating unit, 258 Output unit

INDUSTRIAL APPLICABILITY

As described above, the present invention is applicable to various information processing devices such as a gaming device, an image processing device, and a content reproducing device, a system including the device, and the like.

The invention claimed is:

1. An image generating device generating a pair of images to be respectively displayed for a left eye and a right eye, the image generating device comprising:

a parameter control unit setting a predetermined parameter related to image data in a partial area of one image of the pair of images to make the predetermined parameter for the one image different from the predetermined parameter for an other image of the pair of images;

an image generating unit generating the pair of images in accordance with the setting; and an output unit outputting data of the pair of images to a display device, wherein the display device interpolates the pair of images, wherein the one image is displayed on a first display panel of the display device, wherein the an other image is displayed on a second display panel of the display device, wherein the first display panel and the second display panel have a same size, wherein the one image occupies an entirety of the first display panel, wherein the an other image occupies an entirety of the second display panel, wherein the parameter control unit evaluates the left and right eyes for the pair of images displayed on the display device for stability on a basis of motion of each of gaze points of the left and right eyes, and sets a lower resolution for a part of the image displayed for the eye for which the stability is lower than for the image displayed for the eye for which the stability is higher, and wherein a remainder of the image displayed for the eye for which the stability is lower is at a same resolution as the image displayed for the eye for which the stability is higher.

2. The image generating device according to claim 1, wherein the parameter control unit sets a lower resolution for a part of the image displayed for a user's undominant eye than for the image displayed for a dominant eye.

wherein a remainder of the image displayed for a user's undominant eye is at a same resolution as the image displayed for the dominant eye.

3. The image generating device according to claim 1, wherein the parameter control unit evaluates the stability at a predetermined frequency and switches one image set to have a lower resolution of the pair of images, in response to reversal of a magnitude relationship between the left and right eyes in terms of stability.

4. The image generating device according to claim 1, wherein the parameter control unit sets a lower resolution for only a part of the one image of the pair of images than for the other image, and switches, at predetermined time intervals, the image set to have the lower resolution.

5. The image generating device according to claim 1, wherein the parameter control unit sets a lower resolution for only a part of the one image of the pair of images than for the other image, and switches the image set to have the lower resolution of the pair of images, at switching points between scenes expressed by the displayed images.

6. The image generating device according to claim 1, wherein the parameter control unit sets a lower resolution for a plurality of parts of the one image than other areas of the one image of the pair of images than for the other image, and sets different resolutions for a respective plurality of areas into which a plane of the one image is divided.

7. The image generating device according to claim 1, wherein the parameter control unit sets a lower resolution for a plurality of parts of the one image than other areas of the one image of the pair of images than for the other image, and sets a lower resolution for outside of a gaze area within a predetermined range from the gaze point in the one image than for inside of the gaze area.

8. The image generating device according to claim 1, wherein the parameter control unit, during a period when a head of a user is moving, sets a higher resolution for an area desired to be gazed in terms of contents of the image or an area determined based on targets on which operations are to be performed or contents of the operations of the user for the image than a resolution of an outside of the areas, wherein the resolution outside of the areas is set based on a detected movement speed of the head of the user.

9. The image generating device according to claim 1, wherein the parameter control unit varies at least one of the resolution, a compression rate, a frame rate, and a bit depth between the pair of images.

10. An image display system including a head mounted display and an image generating device generating a pair of images to be respectively displayed for a left eye and a right eye, wherein the image generating device includes a resolution control unit setting a lower resolution for a partial area of one image of the pair of images than for an other image of the pair of images, an image generating unit generating the pair of images at a resolution complying with the setting, and an output unit outputting data of the pair of images to the head mounted display, and the head mounted display includes an image forming unit causing the data of the image with the lower resolution output by the image generating device to be enlarged for display, wherein the one image is displayed on a first display panel of the head mounted display, wherein the an other image is displayed on a second display panel of the head mounted display, wherein the first display panel and the second display panel have a same size, wherein the one image occupies an entirety of the first display panel, and wherein the an other image occupies an entirety of the second display panel, wherein the resolution control unit evaluates the left and right eyes for the pair of images displayed on the display device for stability on a basis of motion of each of gaze points of the left and right eyes, and sets a lower resolution for a part of the image displayed for the eye for which the stability is lower than for the image displayed for the eye for which the stability is higher, wherein a remainder of the image displayed for the eye for which the stability is lower is at a same resolution as the image displayed for the eye for which the stability is higher.

11. A non-transitory computer readable medium having stored thereon a computer program for a computer generating a pair of images to be respectively displayed for a left eye and a right eye, comprising:

by a parameter control unit, setting a predetermined parameter related to image data in a partial area of one image of the pair of images to make the predetermined parameter for the one image different from the predetermined parameter for an other image of the pair of images;

by an image generating unit, generating the pair of images in accordance with the setting; and by an output unit, outputting data of the pair of images to a display device, wherein the one image is displayed on a first display panel of the display device, wherein the an other image is displayed on a second display panel of the display device, wherein the first display panel and the second display panel have a same size, wherein the one image occupies an entirety of the first display panel, wherein the an other image occupies an entirety of the second display panel, wherein the parameter control unit evaluates the left and right eyes for the pair of images displayed on the display device for stability on a basis of motion of each of gaze points of the left and right eyes, and sets a lower resolution for a part of the image displayed for the eye for which the stability is lower than for the image displayed for the eye for which the stability is higher, and wherein a remainder of the image displayed for the eye for which the stability is lower is at a same resolution as the image displayed for the eye for which the stability is higher.

\* \* \* \* \*